Patented June 3, 1952

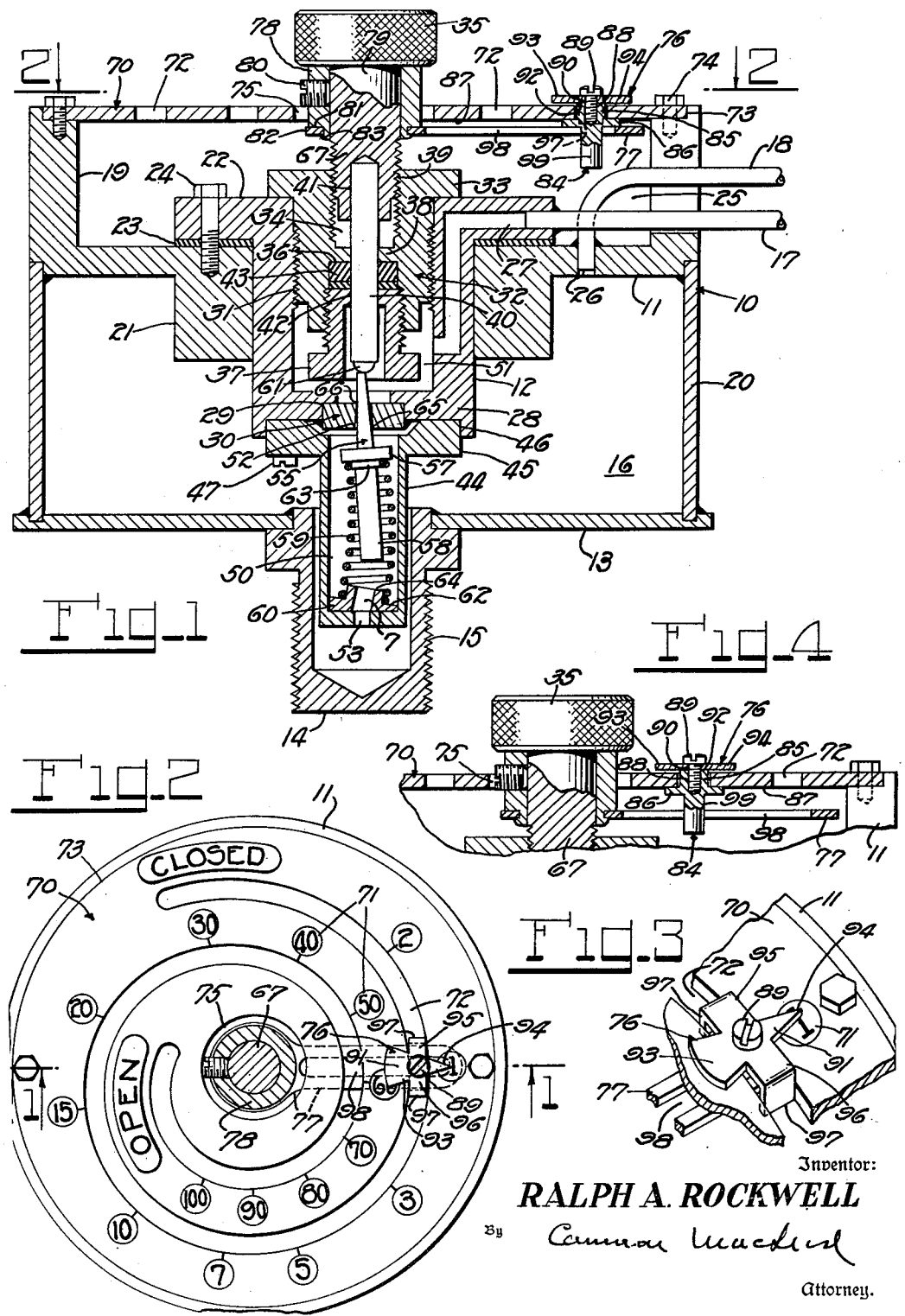

2,599,286

UNITED STATES PATENT OFFICE 2,599,286

VALVE POSITION INDICATOR

Ralph A. Rockwell, Hingham, Mass., assignor to Mason-Neilan Regulator Company, Boston, Mass., a voluntary association of Massachusetts Application June 7, 1946, Serial No. 675,051

1 Claim. (Cl. 116—125)

This invention relates to valves for varying fluid flow, and particularly concerns valves for accurately graduating fluid flow on a desired basis, particularly microscopic flows, as may be required, for example, in conjunction with fluid pressure systems wherein it is desirable to obtain a selected rate of fluid flow from one portion of the system to another, which rate is substantially directly proportional to the pressure drop across the valve orifice.

Valves of the type just referred to are commonly used in the reset system of a proportional reset pneumatic controller for establishing a selected reset rate which is suited to the particular process under control. As is well known to those skilled in the art, allowable reset rates which may be applied to different processes vary over a wide range of values, and therefore the reset rate suited to one process may be 20 to 30 times as great as the reset rate permissible for another process. And since it is customary to obtain a reset rate which is suited to a process by increasing the rate until instability occurs and thereafter reducing the rate until stability is obtained, to achieve stability it is preferable to make rate step reductions on a percentage basis. Thus if the rate at instability is 100 units, it might be found necessary to reduce this rate to 50 units for stability. On the other hand, if the process was unstable at 10 units, stability might be achieved by reducing the rate to 5 units; and since adjustments are made in steps which represent approximate equal percentages of the previous index rate value, when smaller reset rates are involved, it is desirable to provide a scale of indicia which permits very small index settings to be made with accuracy.

While a valve of the type herein referred to is capable of graduating fluid flow on a basis which is substantially proportional to pressure drop across the valve orifice, the axial movement of the valve member is not linear with the change in rate of flow at any given pressure drop across the valve orifice owing to various factors which affect the velocity of flow through a restricted area. Tests serve to show that the flow characteristic of the valve is such that under a given pressure drop, the valve lift per increment of change in flow varies materially throughout the valve operating range. And it therefore becomes desirable to provide a scale of indicia, representing reset rates, on a basis which is substantially in exact correspondence with the flow characteristic of the valve. And since extremely fine graduations of flow are required, it is also desirable to provide means for positioning the stem and valve member axially of the control orifice in a manner whereby a relatively large movement of the adjusting means imparts a relatively small movement to the valve member. For this purpose, it it customary to provide a hand adjustment knob with threads which are closely pitched and require more than one turn of the knob to stroke the valve member throughout its operating range; and it therefore is desirable to provide some form of adjustment indication which will enable the valve to be set substantially at the exact setting desired throughout more than one turn of the adjustment knob.

In order to indicate the adjustment to which the valve is set, the hand adjustment knob is provided in some instances with an index which rotates with the knob against indicia laid out concentrically therewith. However, such a scale fails to show at which turn the adjustment is established when more than one turn is required. One means for overcoming this difficulty is in the form of a pair of meshed gears, one of which turns with the hand knob and rotates a larger gear which is adapted to make not more than one turn throughout the range of adjustment. Thus an index secured to the large gear may operate against a scale concentric therewith to indicate the position of adjustment throughout more than one turn of the knob.

While the last-mentioned method of adjustment is an improvement over the first-mentioned method, it complicates the mechanism and increases the manufacturing cost. Furthermore, since the method of adjustment is on a basis approximating geometric progression, the increment of valve movement and accordingly the spacing between the indicia becomes so congested at one end of the scale, as the valve member approaches its seat, that it is impracticable for the operator to make the adjustments desired because the scale cannot be read with a reasonable degree of accuracy. In the valve embodying this invention I have combined an improved form of adjustment indication with a rotatable and axially movable adjustment knob by which an index may cooperate with a scale of indicia which are amply spaced throughout the operating range of the valve, whereby it becomes a comparatively simple matter to establish an exact setting at any desired reset rate.

Accordingly, it is an object of this invention to provide a valve for varying fluid flow which may be set at the exact valve opening desired.

It is an object of this invention to provide a valve by which the rate of fluid flow, at a given pressure drop across the valve, may be varied substantially in exact accordance with the flow characteristics of the valve.

It is an object of this invention to provide a valve for varying microscopic flows of fluid, including a rotatable adjustment knob requiring more than one turn to vary the valve opening throughout the operating range, by which rates of flow may be established, within the valve capacity, from indicia which may be amply spaced for the purpose.

It is still another object of this invention to provide a reset valve for use in the reset system of a pneumatic controller by which rates of flow may be established as may be indicated by indicia representing reset rates, whereby valve adjustments at each of said indicia vary fluid flow through the valve in accordance with its flow characteristics, thereby providing a substantially exact setting at the reset rate desired.

These and other objects of this invention will be more fully hereinafter set forth and the novel features thereof will be more clearly understood from the following description when taken in connection with the accompanying drawings, in which:

Fig. 1 is a vertical section of a valve embodying my invention, the section being taken on the line 1—1 of Fig. 2;

Fig. 2 is a section taken on the line 2—2 of Fig. 1;

Fig. 3 is a perspective view of certain parts, and

Fig. 4 is a fragmentary view showing certain parts of Fig. 1 in different relative positions.

Having reference to Fig. 1 of the drawings, there is shown a valve, embodying my invention, which is particularly adapted for use in the reset system of a proportional-reset pneumatic controller for establishing a selected rate of fluid flow from one portion of the system to another on a basis which is substantially directly proportional to the pressure drop across the valve. For this purpose the valve preferably is provided with a housing 10 having a flanged member 11 at one end for supporting a valve body 12, and having a plate 13, at the other end, provided with a central opening into which a cup-shaped connector 14 is secured and threaded at 15 for connection with the back plate of a controller, not shown, the parts referred to, together with additional parts to be described, being arranged to define a capacity chamber 16 for the reset system. Pipes 17 and 18 serve to connect the valve body 12 and capacity chamber 16, respectively, with the reset system of a controller which is not herein illustrated, since it is well known to those skilled in the art and may be arranged in any usual manner.

The flange member 11 is provided with an outer cylindrical flange portion 19 which is secured to a wall portion 20 of the housing 10 and forms an extension thereof, an inner cylindrical flange portion 21 being also provided through which the valve body 12 is received and makes a tight joint therewith, preferably by means of an annular flange 22 on the body, a gasket insert 23 and screws 24. The outer cylindrical flange portion 19 has an opening 25 through which the pipes 18 and 17 extend, the former communicating with the capacity chamber 16 through a suitable port 26 in the flange member 11 and the latter communicating with the interior of the cup-shaped body 12 through a port 27 in the body wall.

The valve body 12 has a base 28 at one end with a central bore therein, the base being recessed at 29 to receive an orifice member 30 which may be secured thereto as by solder. The other end of the body 12 is open and is internally threaded at 31 to receive a correspondingly threaded intermediate 32 which has a suitable flange 33 for making a tight joint with the body. Axially of the intermediate 32 is a bore which is enlarged at 34 and threaded at 39 to receive an adjustment screw 67 having an adjustment knob or valve actuator 35, and is also enlarged at 36 to receive a gland nut 37 of inverted cup-shape. Between the enlarged portions 34 and 36 of the bore is a guide portion 38 through which a stem 40 extends and makes a sliding fit therewith. One end of the stem 40 is received within a socket 41 disposed axially of the adjustment knob 35 and the other end of the stem projects into the gland nut 37 through a central opening 42 in the base of the nut with which it makes a sliding fit, suitable packing 43 being provided to prevent leakage between the parts.

Secured to the base 28 of the valve body is a cup-shaped member 44 which is flanged at 45 and is received within a recess 46 in the base of the body to which it may be detachably connected by screws one of which is shown at 47. The cup-shaped member defines a chamber 50 at one side of the orifice member 30 and the valve body 12 together with the intermediate 32, gland nut 37 and stem 40, enclose a chamber 51 at the other side of the orifice member. Axially disposed in the member 30 is an orifice 52 which affords fluid communication between the chambers 51 and 50, the last-mentioned chamber being provided with a port 53 which together with a port 7 in a spring button 60, to be described, serves as a means of connecting the chamber with the capacity chamber 16. Thus the body chamber 51 at one end of the orifice 52 may be in fluid communication with one portion of a reset system of a controller and the chamber 50, at the other end of the orifice, may be in fluid communication with another portion of said system.

In the application herein illustrated, the valve is adapted to graduate microscopic flows of fluid on an extremely fine and accurate basis and for this purpose a valve plug 55 having a very gradual taper is provided. The valve plug extends through the orifice 52, the wall or seating surface of which is correspondingly tapered to provide a tight shutoff, the parts being arranged so that a relatively large increment of valve movement results in a relatively small change in fluid flow. The ratio of orifice length to flow area is such that under a selected range of change in pressure drop across the orifice 52, laminar flow obtains through the orifice so that the rate of fluid flow at a given valve opening varies substantially in direct proportion to the pressure differential across the orifice. The valve plug 55 is provided with a spring button 57 and a shank 58, the former being supported on a helical expansion spring 59 which surrounds the shank and rests on the spring button 60 which is disposed on the base of the cup-shaped member 44. The tapered end of the plug 55 is adapted to be engaged by the valve stem 40 which is provided with a hemi-spherical end 61 so that a ball point contact is obtained between the parts. The spring button 60 is preferably provided with a spring bearing surface 62 which is inclined at an angle to a surface normal to the axis of the orifice 52. Collars 63 and 64 on the spring buttons 57 and 60, respectively, serve to center the spring 59 and by means of the inclined bearing surface 62, the end of the spring which engages the button 57 tends to be biased laterally of the orifice axis whereby the plug is guided at substantially fixed points 65 and 66 at opposite sides and ends of the orifice 52 from a position just off its seat to maximum valve opening. By this means a crescent configuration of flow path is maintained at the ends of the orifice and what is substantially an annular shaped flow path obtains at the mid portion of the orifice, the combined configuration being held substantially unchanged throughout the valve movement. With the parts arranged as described, selected settings of the valve may be repeated with uniform results under the same conditions of pressure drop, and a fluid flow characteristic produced in opening the valve throughout its operating range is substantially repeated in the reverse movement as the valve is closed.

It will be understood that when the valve is applied to a pneumatic system of limited capacity finely graduated adjustments are necessary and for this purpose the threads 39 on the intermediate 32 and the corresponding threads of the adjustment screw 67 are closely pitched so that more than one turn of the knob is required to operate the valve plug 55 from closed to maximum opening. Thus it becomes necessary to provide some form of indication by which the exact setting of the hand knob throughout a range of rotation of more than one turn may be indicated. Furthermore, it will be understood that to obtain the same percentage change in rate of flow at smaller valve openings as occurs at wider valve openings, the adjusted valve movement must be progressively reduced in accordance with the flow characteristic of the valve as the valve plug approaches its seat. Therefore the increments of movement become so reduced at the closing end of the range that indicia representing selected adjustments are necessarily so closely spaced, when laid out on the usual scale concentric to a center of rotation, that it is difficult to indicate an accurate setting.

With a view to providing a means of adjustment indication which may be readily adapted to the flow characteristics of a valve, and which provide ample spacing for indicia throughout the valve operating range, I combine with the housing of the valve a scale plate 70 provided with indicia 71 laid out along one side of a slot 72 having a configuration approximating an Archimedes spiral. The scale plate 70 is received within a recess 73 in the member 11 and may be detachably connected thereto by screws 74, the plate being provided with a central opening 75 through which the adjustment screw 67 extends. An index, generally indicated at 76, is mounted in the scale slot 72 and actuated by an arm 77 which is carried by the adjustment screw 67 and is adapted to rotate therewith. The arm is provided with a collar 78 in the form of a hollow cylinder which is adapted to make a snug fit over an unthreaded portion 79 of the adjustment screw 67 and may be secured thereto at any desired rotative position by means of a set screw 80. The collar 78 is reduced at 81 to receive an annular flange 82 with which the arm 77 is provided and may be peened thereto as indicated at 83. The index 76 is adapted to cooperate with the indicia 71 at the side of the spiral slot 72 and in the valve as herein illustrated, the indicia are positioned to establish valve openings providing rates of fluid flow in accordance with reset rates as required in the reset system of a pneumatic controller.

The index 76 includes a pin 84 having an end portion 85 which is adapted to make a sliding fit in the slot 72, an annular flange 86 being provided at the inner end of said portion for engaging the inner surface 87 of the scale plate at the edges of the slot. Axially of the pin is a bore 88 into which a screw 89 may be threaded, the index being provided with an indicator shown at 91 in Fig. 3 having a central opening 90 through which the screw is freely received whereby the indicator may be clamped against the end surface 92 of the pin. The indicator 91 includes an indicator portion 93 (see Fig. 3) in the form of a segment of a circle, the ends of said portion being adapted to extend over the edges of the slot with its apex 94 in indicating relation with the indicia 71. The length of the end portion 85 of the pin is such that the parts are adapted to slide freely along the slot, the indicator portion 93 and collar 86 functioning to prevent an axial displacement of the pin. In order that the indicator portion 93 of the index may be retained in a position wherein its longitudinal axis is substantially radial with the center of rotation of the adjustment knob 35 I provide guide members 95 and 96 which are preferably integral with the indicator portion and are disposed in the same plane therewith and at right angles to the longitudinal axis thereof. At the ends of the guide members 95 and 96, I provide fingers 97 which engage the slot 72 and make a sliding fit therewith. By this means the index may be maintained in radial relation with the axis of the adjustment knob for cooperation with the indicia 71.

It will be understood that the adjustment knob 35 has a combined rotary and axial movement and that the index 76 has a combined rotary and radial movement. To provide means for operatively connecting the index arm 77 with the index 76, I provide the arm with a longitudinally disposed slot 98 through which a shank 99 of the pin extends and makes a working fit therewith. The slot 98 in the arm is of suitable length to permit the pin 84 to move radially of the scale plate 70 as it travels from one end of the spiral slot 72 to the other, it being understood that the spiral slot is of sufficient length to permit the valve plug 55 to move throughout its operating range as the adjustment knob is rotated. To provide for axial movement of the knob, the pin shank 99 is of sufficient length to engage the arm slot 98 throughout the axial movement required of the valve plug. Thus an index may be actuated to move spirally in a fixed plane by a threaded adjustment knob having a rotary motion and in addition a motion transverse to said index plane.

Referring to Fig. 2 the parts are so arranged that when the adjustment screw 67 is turned clockwise the stem 40 is depressed and the valve is thereby opened. Therefore when the index approaches the inner end of the spiral slot, the valve is wide open, and when it approaches the outer end of said slot, the valve is closed. As the index moves from the inner end of the slot 72, the pin 84 moves radially along the arm slot 98, whereby for each increment of rotation of the adjustment knob, the movement of the index along the spiral slot is progressively increased and since the increments of rotation are necessarily progressively reduced as the valve plug 55 approaches its seat, as pointed out above, the multiplication of movement of the index as it is actuated radially from its center of rotation, substantially offsets the progressively reduced increments of rotation of the knob as the valve approaches its seat. Thus the indicia are amply spaced at the valve closing end of the scale, even though they are laid out on the basis of reset rates wherein the valve movements indicated are necessarily reduced on a basis which approximates geometric progression.

I regard the device embodying my invention as an important improvement in the valve art for it provides an extremely accurate means for establishing valve settings on a desired basis, is reasonably simple and inexpensive to produce, and lends itself to manufacture in quantity lots. While the valve herein shown is particularly adapted for use in connection with the reset system of a pneumatic controller, it will be understood that it may be equally well adapted to other uses where valve adjustment indication is required.

Having thus described my invention, what I claim as new therein and desire to secure by Letters Patent of the United States, is:

In a valve for varying fluid flow on an equal percentage basis in respect to valve lift of the class wherein a rotatable valve actuator in the form of a screw threaded into the valve structure is moved axially on a progressively varying basis, a cylindrical portion secured to said structure having an annular recess at one end thereof, a disc-shaped plate having its periphery mounted in said recess and secured to said cylindrical portion, said plate having a central opening and a slot in the form of an Archimedean spiral surrounding said opening, a screw operating member having an inverted cup-shaped portion into which the outer end of said screw is received and is secured thereto, the inner end of said cup-shaped portion extending through the central opening in said plate and having an annular recess, an arm having an annular flange mounted in said recess and secured to the cup-shaped portion, said arm being disposed in parallel with said plate and having a slot extending along the longitudinal axis thereof, and an index comprising an indicator and a pin, said pin having a flange engaging the inner face of said plate, a portion extending through said spiral slot and a portion extending through the slot in said arm, the portion which extends through the slot in the arm being adapted to engage the slot in said arm throughout the axial movement of said screw, and said indicator being detachably secured to the end of the portion which extends through said spiral slot and including an indicator member and a guide member, said indicator member having portions extending over said plate at opposite sides of said spiral slot and said guide member having fingers at each end thereof making a sliding fit in said spiral slot, a rotation of said screw varying the linear position of said index in said spiral slot on a basis which is in inverse proportional relation to the axial movement of said screw.

RALPH A. ROCKWELL.

REFERENCES CITED

The following references are of record in the file of this patent:

UNITED STATES PATENTS

| Number | Name | Date |
|---|---|---|
| 1,004,450 | Matthews | Sept. 26, 1911 |
| 1,033,866 | Blaine | July 30, 1912 |
| 1,678,459 | Bowland | July 24, 1928 |
| 1,685,426 | Loewe | Sept. 25, 1928 |
| 1,975,675 | Antelme | Oct. 2, 1934 |
| 1,994,336 | Dawson | Mar. 12, 1935 |
| 2,193,309 | Wheless | Mar. 12, 1940 |
| 2,193,581 | Clokey | Mar. 12, 1940 |
| 2,239,842 | Evans | Apr. 29, 1941 |
| 2,317,063 | Johnson | Apr. 20, 1943 |
| 2,452,956 | Robins | Nov. 2, 1948 |

FOREIGN PATENTS

| Number | Country | Date |
|---|---|---|
| 168,227 | Great Britain | Sept. 1, 1921 |
| 199,714 | Switzerland | Sept. 15, 1938 |